United States Patent [19]

Amstad

[11] 4,169,528
[45] Oct. 2, 1979

[54] APPLE ORIENTING SYSTEM
[75] Inventor: John H. Amstad, Alameda, Calif.
[73] Assignee: Atlas Pacific Engineering Company, Emeryville, Calif.
[21] Appl. No.: 859,876
[22] Filed: Dec. 12, 1977
[51] Int. Cl.² .......................................... B65G 47/24
[52] U.S. Cl. ................................... 198/385; 198/394
[58] Field of Search ............. 198/385, 386, 387, 384, 198/394, 395, 646, 655; 83/411 R, 415, 418

[56] References Cited
U.S. PATENT DOCUMENTS
2,933,174   4/1960   Hait et al. ........................... 198/386

3,586,081   6/1971   Loveland ............................. 146/39

Primary Examiner—James B. Marbert
Assistant Examiner—Douglas D. Watts
Attorney, Agent, or Firm—Robert H. Eckhoff

[57] ABSTRACT

This invention relates to an apple orienting device suited to orient apples particularly those known as the Red Delicious variety and which are generally relatively long as compared to their diameter. The present orientor includes a pair of eccentrically mounted wheels, and represents an improvement over presently known devices. The orienter uses two eccentrically mounted wheels to aid in orienting the apples.

5 Claims, 10 Drawing Figures

APPLE ORIENTING SYSTEM

BACKGROUND OF THE INVENTION

The purpose of the orienting system is to position each apple so that it is at rest with its core extending vertically and with the stem end either up or down. In this position, the apple can be effectively transferred to a machine for peeling and coring the apple such as is shown in U.S. Pat. Nos. 3,586,081 and 3,586,151.

The orienting system in current use employs a cup, a rotating eccentric wheel located in the bottom of the cup and spring loaded wire fingers located at various space points about the orienting conveyor. Reference can be made to a showing of this in U.S. Pat. Nos. 3,586,081 and 3,738,474. Apples are fed to each cup in an unoriented position. The rotating eccentric wheel contacts the side of the apple and turns it until the indent of the stem end or blossom end is reached. The wheel then can no longer touch the apple so the apple remains in its oriented position. The fingers aid harder to orient apples by slightly turning them in the cup so the eccentric wheel will turn the apple on a different track, thus enabling the indent to be reached more quickly.

Some problems have been encountered with this system. For instance, the fingers must be constantly watched and adjusted so that they do not disorient an already oriented apple. Long apples do not orient well with this system because of their concave sides and their tendency to lay horizontally rather than to stand vertically.

SUMMARY OF THE INVENTION

In accordance with this invention, a cup is provided similar to that used previously. However, the cup is now mounted so it can be tilted at an angle of up to 7°. An eccentric wheel is mounted similarly but another wheel is provided on the same shaft as that used to rotate the eccentric wheel, this being adjustable in position and of a larger diameter with a conical portion providing a conical face which is rough or knurled. The usual helper wheel is also provided as is shown in the aforementioned U.S. Pat. No. 3,738,474.

Apples are delivered to each cup and, as the apple begins its journey, the slight tilt of the cup urges the apple into contact with the knurled conical wheel while the eccentric wheel is attempting to turn the apple. If the apple is laying with the core horizontal and crosswise, part of the apple will be in contact with the large wheel which will quickly rotate to an angle of approximately 90°. The peripheral speed of the larger wheel is faster than the smaller eccentric wheel so the axis of rotation of the apple is substantially horizontal. The larger conical wheel can no longer touch the apple with the core parallel to the plane of rotation of the larger wheel but the apple is in position to be further rotated by the eccentric wheel. The idler wheel also helps the eccentric wheel rotate the apple so the core is vertical. With one of the indents over the eccentric wheel, the apple is properly oriented. One or two fingers can be used to help push an apple into contact with the lateral wheel.

It is in general the broad object of the present invention to provide an improved apple orientor, particularly suited to the handling of apples which are characterized by being relatively long compared to their diameter.

DESCRIPTION OF THE PREFERRED EMBODIMENT

Figure 1:
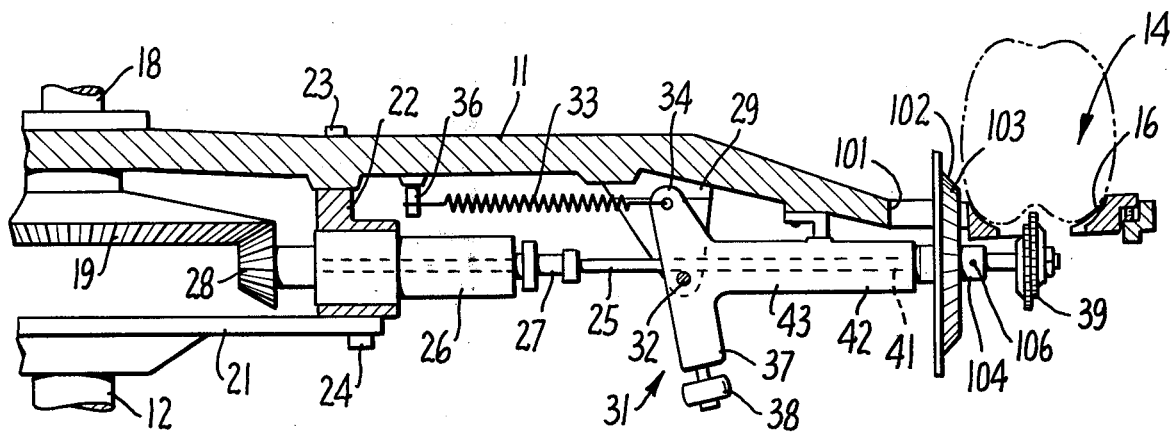
FIG. 1 is a side elevation partly in section showing an orienting cup and the several wheels.
Figure 2:
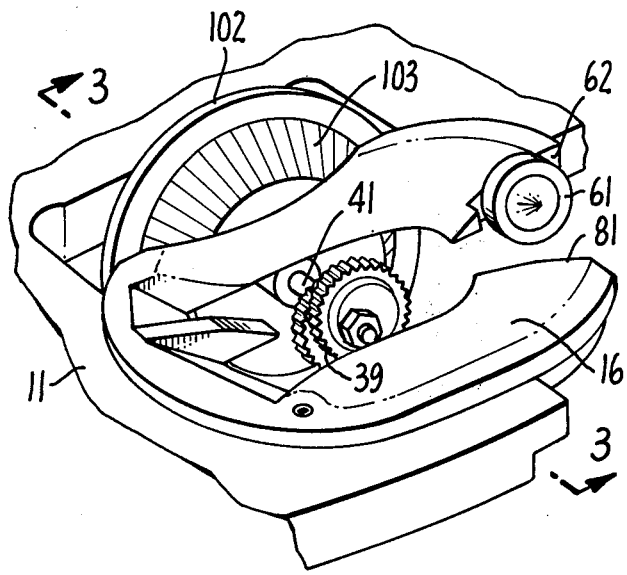
FIG. 2 is a perspective view showing one of the receptacles including the orienting means of the present invention.
Figure 4:
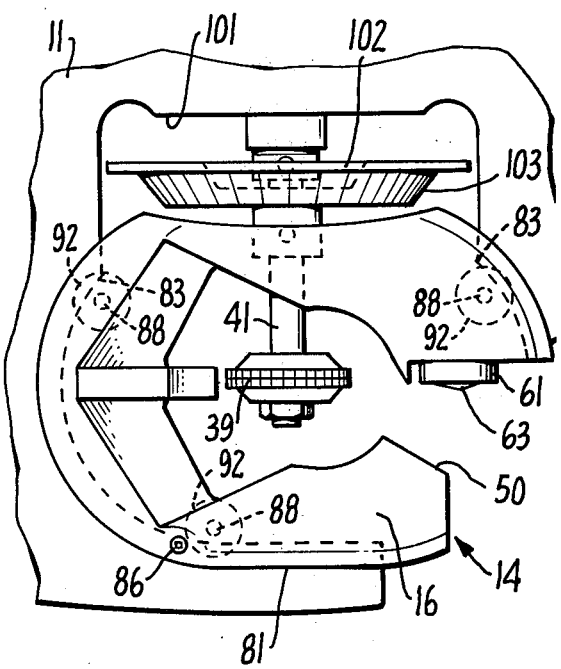
FIG. 4 is a plan view of the orienting mechanism shown in FIG. 3.

Referring particularly to FIGS. 1 and 2, a circular plate 11 is mounted for rotation by a central shaft 12. The plate includes a plurality of receptacles, each generally indicated at 14, and each of which includes a frusto-conical side wall 16 and an open bottom 17. Apples are fed onto the plate at a feeding station as the plate turns in a counterclockwise direction.

Mounted centrally on the plate 11 is a shaft 18 carrying a bevel gear 19. A circular plate 21 is provided upon the upper end of shaft 12 and a ring 22, attached to plate 11 and plate 21 by bolts 23 and 24, supports plate 11 for rotation with shaft 12. At each location of a receptacle 14, a sleeve 26 supports a shaft 27, each shaft 27 having a pinion gear 28 thereon enmeshed with the bevel gear 19 and rotated thereby. Midway of plate 11 and again adjacent each receptacle, a plurality of depending ears 29 are provided. A three arm yoke-like lever 31 is mounted on pins 32 on each pair of ears 29. A spring 33 is provided between arm 34 of the lever 31 and a pin 36 depending from the plate 11 to bias the bell crank in the position shown in FIG. 1. Arm 37 of the lever 31 includes a roller 38 which engages a cam track (not shown), the cam brack being effective to move the lever downwardly so that wheels 39 on the end of shaft 41 are moved out of orienting position. The wheels are preferably mounted off-center on shaft 41 so that they wobble as they rotate in a clockwise direction when observed from the free end of shaft 41, the shaft 41 being connected by a flexible cable 25 to the rotating shaft 27. The periphery of the wheels 39 is knurled as at 40. Shaft 41 is secured in a bearing 42 which extends from the third arm 43 of the lever 31. Each wheel is moved out of position between the locations indicated at 46 and 48 in FIG. 1 of U.S. Pat. No. 3,738,474 by the cam track so that an oriented apple can be picked up by suitable pickup mechanism which moves over a circular path indicated at 49 in U.S. Pat. No. 378,474 and which refines vertical alignment of the indents.

As I have previously mentioned, the orienting device so far described is quite successful in orienting apples which have a normal apple shape, but it is not successful in handling apples such as the Red Delicious variety, which apples are relatively elongated and may even have a rounded corner quadrilateral cross section. Generally the blossom end with have five bumps which may grossly distort the quadrilateral shape at the blossom end. Further, the device described so far is not successful in handling apples which have protruding stiff stems.

Figure 3:
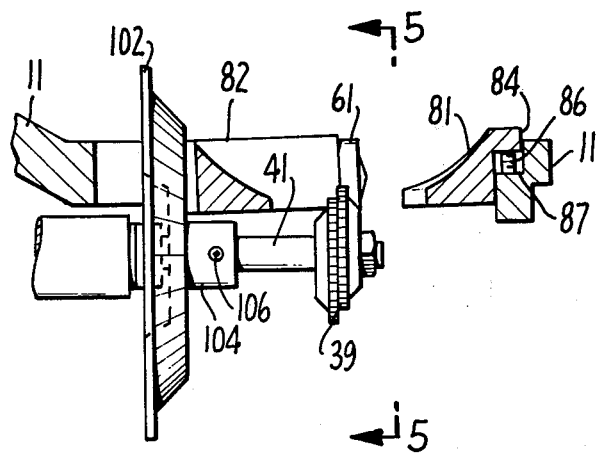
FIG. 3 is a section taken along line 3—3 in FIG. 2.
Figure 5:
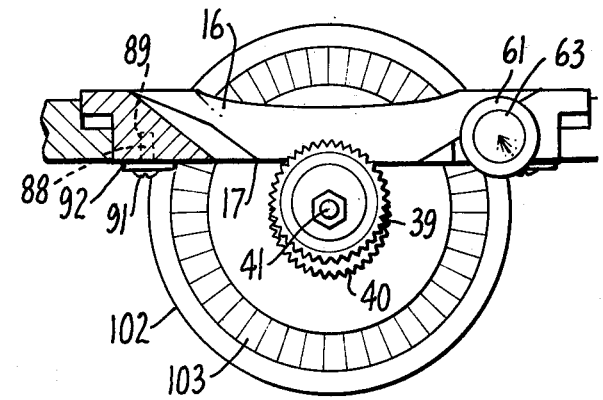
FIG. 5 is a section taken along the line 5—5 in FIG. 3.

In accordance with the present invention, I provide a second wheel 61, this wheel being supported on face 62 provided on the receptacle side wall and supported therein for free rotation by a shaft 63. The wheel 61 is adjustably mounted so that the periphery of the wheel extends above the side wall of the receptacle by a suitable distance as appears in FIGS. 3 and 5 in U.S. Pat. No. 3,738,474. The second wheel 61 is mounted substantially on the central vertical plane passed through the wheels 39 and closely adjacent to an arcuate opening 50 provided in the receptacle 14. Further, and in accordance with this invention, the upper surface of the wheel 61 is closely adjacent to but below the upper surface of the frusto-conical side wall 16 and within the vertical projected area of the fruit. By the term "vertical projected area of the fruit", I mean that area which would appear in shadow on a horizontal plane immediately below the apple when the apple was illuminated by a light providing illumination normal to the horizontal plane. This enables the wheel 61 to provide support for any apple fed to the device and which is in the usual broad size range of apples processed commercially.

In accordance with this invention, each of the receptacles generally indicated at 14 is provided as a separate element on the plate 11, each such element being indicated as at 81. Each element is mounted on the plate 11 in a suitable aperture. The inner side wall of each element 81 rests against side wall 83 while the outer side wall 84 is tilted by means of screw 86 which engages a shelf 87 on the plate 11. The receptacle is also retained in a desired position by screws 88 which are screwed into threaded bores 89 in receptacle 14. The head 91 on screws 88 rests against supporting washers 92 on the underside of the plate. By changing the adjustment of screws 86 and 88, the receptacle 81 can be tilted at a desired angle, usually up to 7°, as has been previously stated, to the plane of the plate 11.

Further in accordance with this invention, I mount upon shaft 41 in a suitable aperture 101 in the plate 11 a relatively large wheel 102. This wheel has a conical knurled face 103 and rotates closely adjacent to the side wall of the receptacle 11 to engage an apple therein. Usually the diameter of the large wheel is about 3½ inches but this can be varied as can the relation of the wheel to the side of the receptacle by sliding the bearing support 104 along the shaft upon release of set screw 106.

Figure 6:
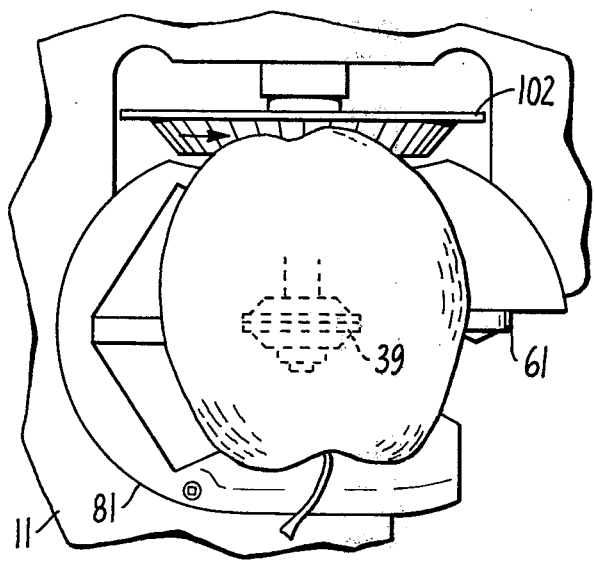
FIGS. 6 through 10 are plan views showing an apple undergoing orientation, as its movement from a disoriented position to one in which it is correctly oriented with the core extending vertically and the stem end uppermost.
Figure 7:
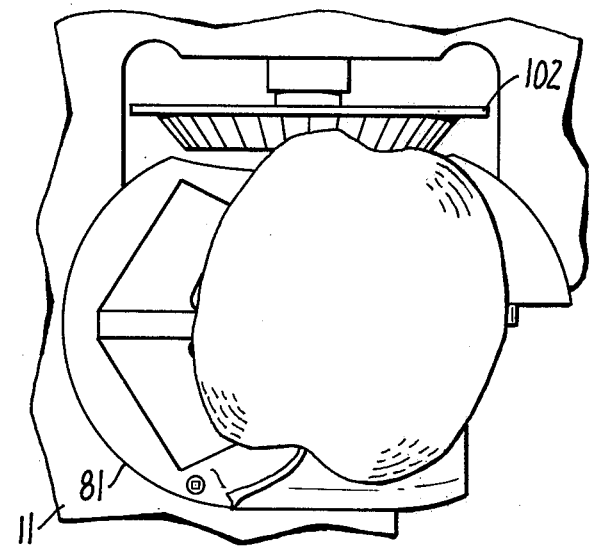
Figure 8:
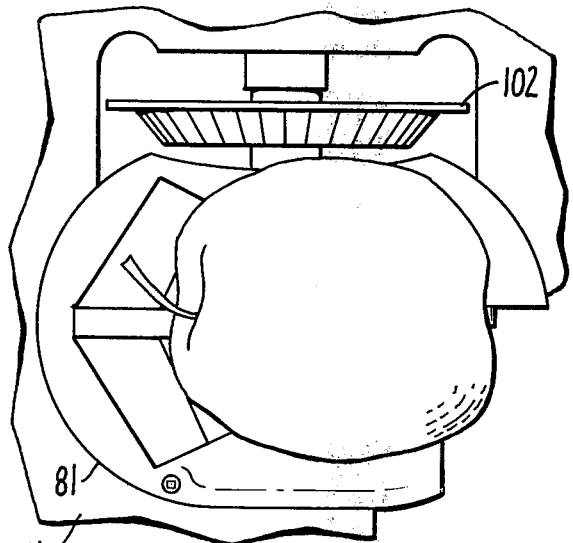
Figure 9:
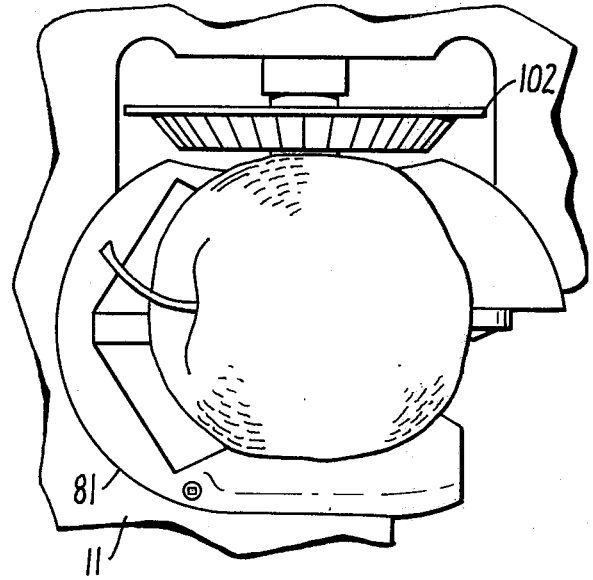
Figure 10:
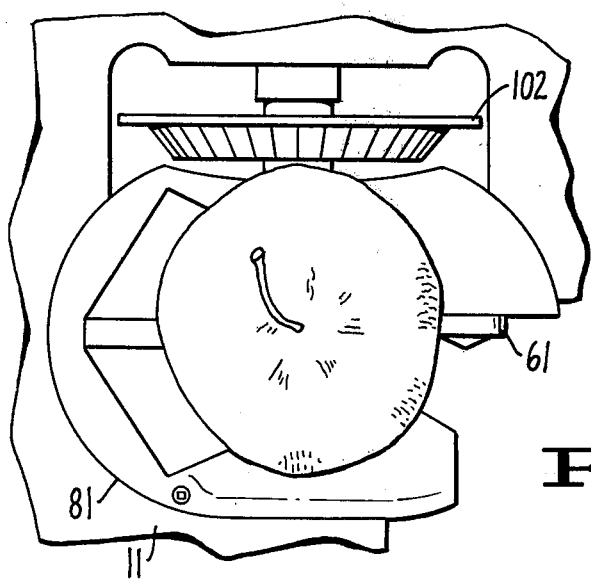

Referring now to the diagrams shown in FIGS. 6 through 10, a large apple is shown in a typical delivery position in FIG. 6, the apple laying with its core horizontal and crosswise so that the side of the apple is engaged with the large wheel 102. The apple is quickly rotated by this wheel from a position in FIG. 6 to the position in FIG. 7 and then into the position shown in FIG. 8 in which the apple extends horizontally but is reversed 90° from that position in which the apple is shown in FIG. 6. In this last position (FIG. 8), the small wheels 39 and the support wheel 61 assist in turning the apple from the position in FIG. 8 into the transitional position of FIG. 9 and then into the final position of the apple in FIG. 10 so that one of the indents of the apple is over the eccentric wheel and the apple is properly oriented.

I claim:

1. An apple orientor comprising a support movable over a path in a horizontal plane, at least one receptacle in said support having an open bottom and a frusto-conical side wall, means mounting said receptacle on said support for movement with respect to said plane, a shaft rotatably mounted on the underside of said support and extending to a position below the opening in said receptacle, a plurality of wheels each mounted eccentrically on said shaft for rotating in a first vertical plane in said open bottom to rotate an unoriented fruit positioned in said receptacle, another wheel mounted upon said shaft for rotation adjacent the outer upper edge of the receptacle to engage a fruit in said receptacle.

2. In an orientor as in claim 1, wherein the another wheel is of a diameter such that the upper edge of the another wheel extends above the upper surface of the cup, the surface of said another wheel being roughened to provide a fruit engaging surface for contact with a fruit positioned in the cup.

3. In a fruit orientor as in claim 1, wherein each of said plurality of wheels has a knurled surface for engaging a fruit in the cup.

4. In an orientor as in claim 1, further including a helper wheel for orienting a piece of fruit in a horizontal plane.

5. In an orientor as in claim 1, further including means on said receptacle for tilting said receptacle.

* * * * *